United States Patent
So et al.

(10) Patent No.: US 6,614,761 B1
(45) Date of Patent: Sep. 2, 2003

(54) ADSL SUBSCRIBER PROCESSING EQUIPMENT IN ATM SWITCH

(75) Inventors: Woon Seob So, Taejon (KR); Sung Mo Yang, Taejon (KR); Jin Tae Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/448,531

(22) Filed: Nov. 22, 1999

(30) Foreign Application Priority Data

Nov. 23, 1998 (KR) .......................................... 1998-50250

(51) Int. Cl.7 ............................................ H04L 12/26
(52) U.S. Cl. ..................... 370/249; 370/395.1; 370/466
(58) Field of Search ................................. 370/241, 249, 370/395.1, 397, 399, 395.3, 395.31, 463, 466, 474

(56) References Cited

U.S. PATENT DOCUMENTS

| | | | |
|---|---|---|---|
| 5,408,260 A | | 4/1995 | Arnon .......................... 348/6 |
| 5,461,616 A | | 10/1995 | Suzuki ......................... 370/79 |
| 5,812,786 A | | 9/1998 | Seazholtz et al. ...... 395/200.63 |
| 6,049,531 A | * | 4/2000 | Roy ............................. 370/352 |
| 6,141,339 A | * | 10/2000 | Kaplan et al. .............. 370/352 |
| 6,233,250 B1 | * | 5/2001 | Liu et al. .................... 370/235 |

* cited by examiner

*Primary Examiner*—Kwang Bin Yao
(74) *Attorney, Agent, or Firm*—Seed IP Law Group PLLC

(57) ABSTRACT

An ADSL subscriber processing equipment in ATM switch is provided. The ADSL subscriber is connected with ATM layer processing device by transmit-receive cellbus and control signal bus and is connected with a number of ADSL subscribers by ADSL line. The ADSL (asymmetric digital subscriber line) subscriber processing equipment in accordance with the present invention includes transmit-cell processing means ATM physical layer processing means ADSL processing means receive-cell processing means and central control means.

14 Claims, 2 Drawing Sheets

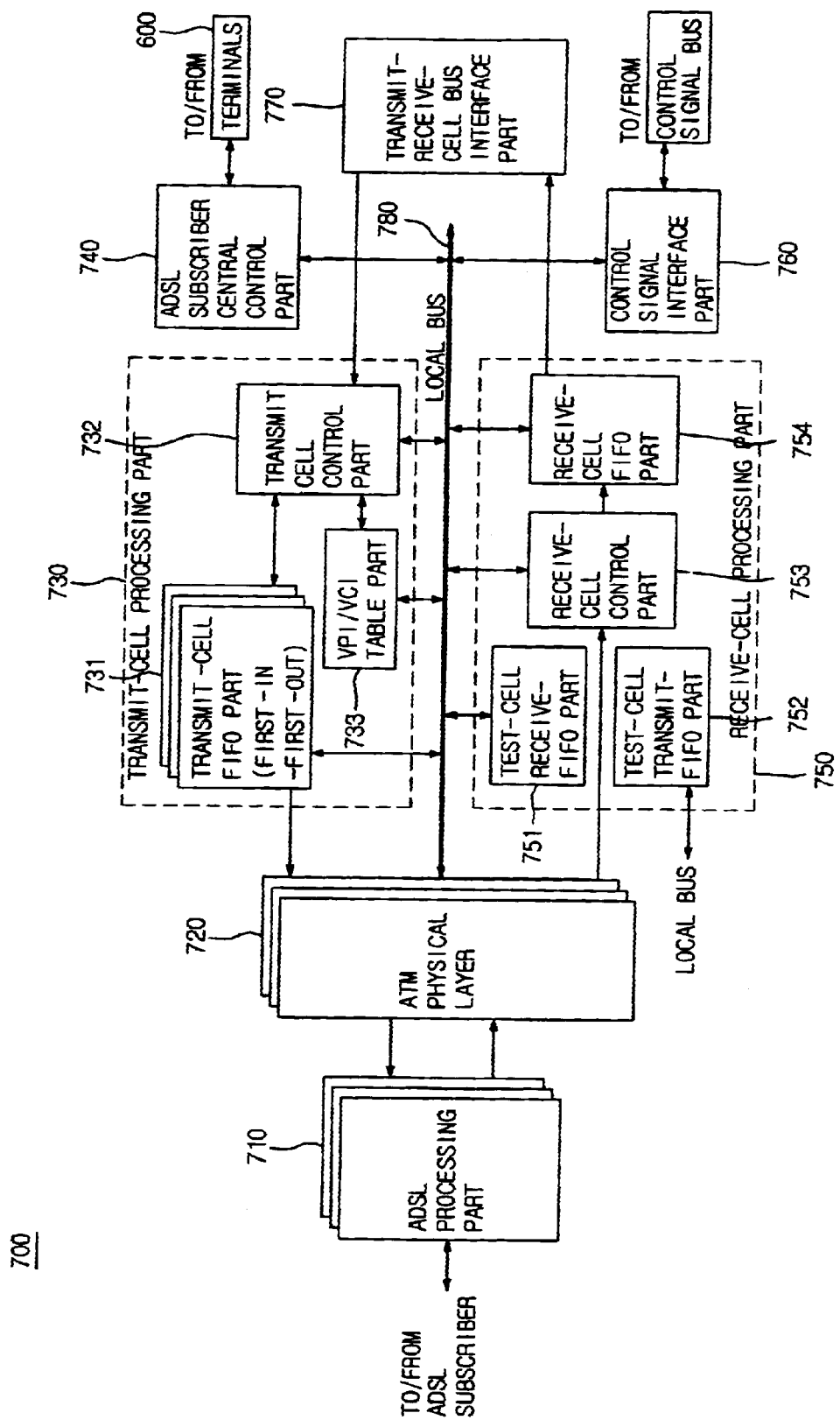

ADSL SUBSCRIBER PROCESSING EQUIPMENT IN ATM SWITCH

TECHNICAL FIELD

The present invention relates to an ADSL subscriber processing equipment in ATM switch, which provides various ATM services such as video conference, high speed internet connection and video-on-demand service to subscribers who uses HDSL (High-bit-rate Digital Subscriber Line).

BACKGROUND OF THE INVENTION

Conventional low-speed symmetric subscriber processing equipment is not able to provide high speed service and multimedia application program service to remote users because it uses same speed for both sending and receiving. Also, since the low-speed symmetric subscriber processing equipment should be installed outside of switching equipment, ADSL subscribers cannot be controlled and the status of ADSL subscribers cannot be known from inside of the switching equipment.

SUMMARY OF THE INVENTION

An ADSL subscriber processing equipment in ATM switch is provided. The ADSL subscriber is connected with ATM layer processing device by transmit-receive cellbus and control signal bus and is connected with a number of ADSL subscribers by ADSL line.

The ADSL (asymmetric digital subscriber line) subscriber processing equipment in accordance with the present invention includes transmit-cell processing means ATM physical layer processing means ADSL processing means receive-cell processing means and central control means. The transmit-cell processing means detects ADSL subscribers on the basis of ATM parallel transmit-cell. The ATM parallel transmit-cell is supplied by the ATM layer processing device. The ATM physical layer processing means converts the parallel transmit-cell into serial data, performs signal processing on the serial data, sends the signal-processed serial data to ADSL processing means, and converts serial transmit-cell into parallel data. The serial transmit-cell is supplied by the ADSL processing means. The ADSL processing means receives serial transmit-cell from the ATM physical layer processing means, performs ADSL downstream process on the serial transmit-cell, sends the processed serial transmit-cell to ADSL subscriber through ADSL line, receives ADSL upstream from the ADSL subscriber, performs signal processing on the ADSL upstream, and sends the signal processed ADSL upstream to the ATM physical layer processing means. The receive-cell processing means receives parallel receive-cell from the ATM physical layer processing means, adds subscriber information to the parallel receive-cell, and sends information added parallel receive-cell to the ATM layer processing device. The central control means assigns addresses to the transmit-cell processing means, the ATM physical layer processing means, the ADSL processing means, and the receive-cell processing means, controls ADSL subscriber processing device by providing system clock, and generates test-cell for self loopback test.

Desirably, the ADSL subscriber processing equipment further includes transmit-receive cellbus interface means for making interface between the transmit-receive cellbus and the transmit-cell processing means/receive-cell processing means.

Desirably, the transmit-cell processing means detects ADSL subscriber to whom the transmit-cell is to be delivered on the basis of VPI (virtual pass identifier) and VCI (virtual channel identifier) in case that the transmit-cell is point-to-point transmit-cell and detects ADSL subscriber to whom the transmit-cell is to be delivered by converting VPI and VCI into real VPI and real VCI in case that the transmit-cell is point-to-multi point transmit-cell, the VPI and VCI included in the transmit-cell.

Desirably, the transmit-cell processing means includes VPI/VCI table part and Transmit-cell control part. The VPI/VCI table part stores real VPI and real VCI. The real VPI and the real VCI correspond to VPI and VCI of point-to-multi point transmit-cell respectively. The Transmit-cell control part bit-converts transmit-cell received from the transmit-receive cellbus interface means, detects ADSL subscribers to whom the transmit-cell is to be delivered on the basis of VPI and VCI of the transmit-cell, and sends the bit-converted transmit-cell to the ATM physical layer processing means.

Desirably, the transmit-cell processing means further includes transmit-cell FIFO (first-in first-out) part. The transmit-cell FIFO part stores bit-converted transmit-cell temporarily. The bit-converted transmit-cell is sent from transmit-cell control part to ATM physical layer processing means.

Desirably, the transmit-cell control part converts the 16 bit parallel transmit-cell into 8 bit parallel transmit-cell.

Desirably, the receive-cell processing means includes receive-cell control part and receive-cell FIFO (First-in First-out). The receive-cell control part analyzes receive-cell provided by the ATM physical layer processing means, adds ADSL subscriber information to the receive-cell, performs bit-conversion on the receive-cell, and sends the bit-converted receive-cell to transmit-receive cellbus interface means. The receive-cell FIFO (First-in First-out) stores receive-cell temporarily. The receive-cell is sent from the receive-cell control part to the transmit-receive cellbus interface means.

Desirably, the receive-cell processing means includes test-cell transmit-FIFO part and test-cell receive-FIFO part. The test-cell transmit-FIFO part stores test-cell and provides the test-cell to the receive-cell control part. The test-cell is generated by the central control means for use of loopback test. The test-cell receive-FIFO part receives test-cell from the receive-cell control part and sends the test-cell to the central control means.

Desirably, the transmit-receive cellbus interface means receives test-cell from the receive-cell control part, sends the test-cell to the transmit-cell control means, receives receive-cell from the receive-cell control part, sends the receive-cell to the transmit-receive cellbus, receives transmit-cell from the transmit-receive cellbus, and sends the transmit-cell to the transmit-cell control means.

Desirably, the receive-cell control means converts the 8 bit parallel receive-cell into 16 bit parallel receive-cell.

Desirably, the ADSL subscriber processing equipment further includes control signal bus interface means. The control signal bus interface means communicates various control signals, data signal, and clock signal with the ATM layer processing device through dual port RAM and sends the various control signals, data signal, and clock signal to the transmit-cell processing means, the ATM physical layer processing means, the ADSL processing means, the receive-cell processing means, and the central control means.

Desirably, the control signal bus interface means receives main clock of ECL (emitter coupled logic) level, cellbus clock of ECL level, converts the main clock of ECL level and the cellbus clock of ECL level into main clock of TTL (transistor transistor logic) level and cellbus clock of TTL level, and sends the main clock of TTL level and the cellbus clock of TTL level to the transmit-cell processing means, the ATM physical layer processing means, the ADSL processing means, the receive-cell processing means, and the central control means.

Desirably, the central control means generates function-alarm-signal and eject-alarm-signal when an error is occurred in ADSL subscriber processing device and the control signal bus interface means sends the function-alarm-signal and the eject-alarm-signal to the ATM layer processing device.

Desirably, the ADSL subscriber processing equipment transmits downstream data at speed of 1 Mbps~8 Mbps and transmits upstream data at speed of 64 kbps~640 Kbps. The downstream data is sent from the ATM layer processing device to ADSL subscribers and the upstream data is sent from ADSL subscribers to the ATM layer processing device.

BRIEF DESCRIPTION OF THE DRAWINGS

The embodiments of the present invention will be explained with reference to the accompanying drawings, in which:

FIG. 2 is a block diagram illustrating an ADSL subscriber processing equipment in accordance with the present invention.

DETAILED DESCRIPTION OF THE INVENTION

Figure 1:
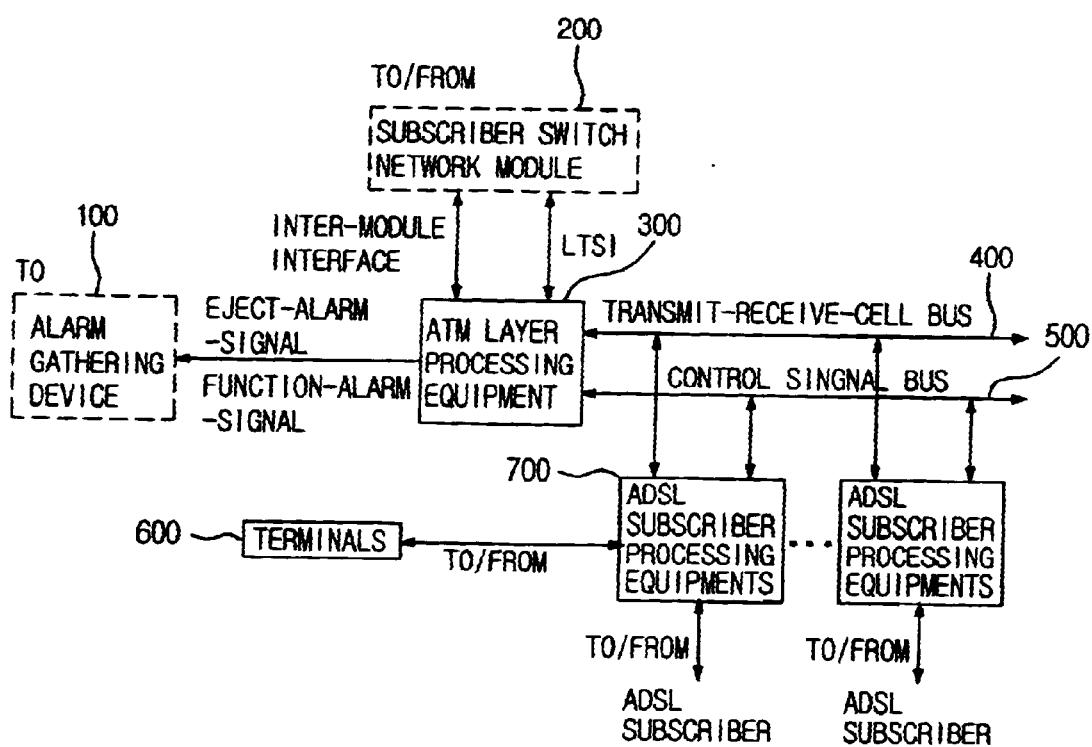
FIG. 1 is a block diagram illustrating an ADSL subscriber interface module in accordance with the present invention.

FIG. 1 is a block diagram illustrating an ADSL subscriber interface module in accordance with the present invention. The ADSL subscriber interface module includes an ATM layer processing equipment 300 and sixteen ADSL subscriber processing equipments 700. Each ADSL subscriber processing equipment 700 is able to hold four ADSL subscribers and totally, the ADSL subscriber interface module is able to hold sixty four ADSL subscribers. Each ADSL subscriber processing equipment 700 processes ATM cells and provides high speed ATM data service to ADSL subscribers.

The ATM layer processing equipment 300 sends and receives differential-signal-serial-data of 187.79 Mbps with the subscriber switch network module 200 through IMI (Inter-Module Interface). If the ATM layer processing equipment 300 detects eject-alarm-signal and function-alarm-signal from the ADSL subscriber processing equipments 700, it transmits the eject-alarm-signal and the function-alarm-signal to alarm gathering device 100.

The ATM layer processing equipment 300 communicates with the ADSL subscriber processing equipments 700 through the transmit-receive cellbus 400. That is, the ATM layer processing equipment 300 provides transmit-cell-16 bit-data (TCELL0~TCELL15) and transmit-cell-start-signal (TSOC*) to each ADSL subscriber processing equipments 700. The transmit-cell-start-signal (TSOC*) indicates transmit-cell-start. In addition, the ATM layer processing equipment 300 receives receive-cell-16 bit-data (RCELL0~RCELL15) and receive-cell-start-signal (RSOC*). The receive-cell-start-signal (RSOC*) indicates receive-cell-start.

When the ATM layer processing equipment 300 receives cell-receive-request-signal (CRREQ0*~CRREQ15*) from the ADSL subscriber processing equipments 700, it generates cell-receive-acknowledge-signal (CRACK0*~CRACK15*) to the ADSL subscriber processing equipments 700 with an order.

If a cell received from the ADSL subscriber processing equipments 700 is an OAM cell (operation, administration and maintenance), the ATM layer processing equipment 300 performs operation, administration, and maintenance function and sends a response-operation-and-maintenance-cell to the ADSL subscriber.

The ATM layer processing equipment 300 receives LTSI (46.9494 MHz) from the subscriber switch network module 200 at ECL (emitter coupled logic) level. The LTSI (46.9494 MHz) is a system synchronization signal. Then, the ATM layer processing equipment 300 generates main clock and cellbus clock and provides them to the ADSL subscriber processing equipments 700. That is, main clock (23.4747 MHz) and cellbus clock (11.7373 MHz) is generated by clock synthesis and clock division of the system synchronization signal.

When function alarm signal (FUNA0~FUNA15) and eject alarm signal (OFFA0~OFFA15) becomes logic high, the ATM layer processing equipment 300 notifies the fact to the alarm gathering device 100.

The ADSL subscriber processing equipments 700 send and receive cells with the ATM layer processing equipment 300 through the transmit-receive cell bus 400. The ADSL subscriber processing equipments 700 receive transmit-cell-16 bit-data and transmit-cell-start-signal from the ATM layer processing equipment 300 and send receive-cell-16 bit-data and receive-cell-start-signal to the ATM layer processing equipment 300. In addition, the ADSL subscriber processing equipments 700 send cell-receive-request-signal to the ATM layer processing equipment 300 and receive cell-receive-acknowledge-signal from the ATM layer processing equipment 300.

The ADSL subscriber processing equipments 700 receive address signal, address-valid signal, data-valid signal, read/write signal, main clock, and cellbus clock from the ATM layer processing equipment 300 through control signal bus 500. The ADSL subscriber processing equipments 700 send and receive data signal with the ATM layer processing equipment 300 through control signal bus 500. Dual port RAM in the ADSL subscriber processing equipments 700 and the ATM layer processing equipment 300 are interfaced. The ADSL subscriber processing equipments 700 notifies function alarm signal and eject alarm signal to the ATM layer processing equipment 300.

FIG. 2 is a block diagram illustrating an ADSL subscriber processing equipment in accordance with the present invention. The ADSL subscriber processing equipments 700 are connected with the ATM layer processing equipment 300 through transmit-receive-cellbus 400 and the control signal bus 500. The ADSL subscriber processing equipments 700 are contacted with subscribers through ADSL line.

The ADSL subscriber processing equipments 700 includes ADSL processing part 710, ATM physical layer processing part 720, transmit-cell processing part 730, central control part 740, receive-cell processing part 750, control signal interface part 760, transmit-receive-cellbus-interface part 770, and local bus 780.

32 bit microprocessor, two units of 512 KB ROM, and four units of 512 KB RAM implement the central control part 740 and the central control part 740 controls the ADSL subscriber processing equipments 700. The central control part 740 generates data signal, address signal, and control signal, buffers the signals, and provides the signals to the local bus 780. Also, the central control part 740 combines the signals and assigns addresses to registers and devices in the ADSL subscriber processing equipments 700.

The central control part 740 includes a 49.152 MHz clock generator and a 25 MHz clock generator. Clocks are buffered and divided and then provided to the local bus 780, transmit-cell processing part 730, and receive-cell processing part 750. When power is supplied or RESET switch is manually set, the central control part 740 generates RESET signal and provides the RESET signal to the local bus 780. The central control part 740 is equipped with the input-output capability and is connected with terminals through RS-232C communication port.

The transmit-cell processing part 730 is connected with the local bus 780 and includes transmit-cell FIFO part (first-in-first-out) 731, transmit-cell control part 732, and VPI/VCI table part 733. The transmit-cell processing part 730 receives 16 bit transmit-cells from the transmit-receive-cellbus-interface part 770 and converts the 16 bit transmit-cells into 8 bit transmit-cells. Generally, one ADSL subscriber processing equipments 700 contains four ADSL subscribers. The transmit-cell processing part 730 detects ADSL subscribers to deliver the 8 bit transmit-cells and finally sends the 8 bit transmit-cells to the subscribers.

In case of point-to-point transmit-cell, in which a transmit-cell is delivered to one ADSL subscriber, the transmit-cell control part 732 detects subscribers with the help of VPI (virtual pass identifier) and VCI (virtual channel identifier) and delivers the transmit-cell to an appropriate transmit-cell FIFO part among four transmit-cell FIFO part 731.

In case of point-to-multi point transmit-cell, in which a transmit-cell is delivered to at least two ADSL subscribers, VPI and VCI of the transmit-cells are converted into real VPI value and real VCI value in reference to the VPI/VCI table part 733. In case of point-to-multi point transmit-cell, one VPI and VCI is assigned into several subscribers. The transmit-cell control part 732 detects the ADSL subscribers to deliver a transmit-cell by applying VCI and VPI of the transmit-cell to the VPI/VCI table part 733 and delivers the transmit-cell to the transmit-cell FIFO part of the subscriber. Data stored at the transmit-cell FIFO part is provided to the ATM physical layer processing part 720.

The VPI/VCI table part 733 stores VPI and VCI conversion table of point-to-multi point transmit-cell supplied from the central control part 740. When point-to-multi point transmit-cell is supplied, transmit-cell control part 732 converts real VCIs and real VPIs in reference to the VPI/VCI table part 733.

A transmit-cell FIFO part is assigned to each ADSL subscriber and therefore four transmit-cell FIFO parts are included in a transmit-cell processing part. The transmit-cell control part 732 temporarily stores transmit-cells and delivers them to the ATM physical layer processing part 720. In an embodiment of the present invention, four 1 KB FIFO buffers implement the transmit-cell FIFO parts and the memory can be extended into 32 KB.

The ATM physical layer 720 is composed of four units and a unit is assigned for a subscriber. The ATM physical layer 720 receives parallel transmit-cell from the transmit-cell FIFO part 731 and converts the parallel transmit-cell into serial transmit-cell. Then, the ATM physical layer 720 performs ATM physical layer process and sends the serial data to the ADSL processing part 710. In addition, the ATM physical layer 720 receives serial data from the ADSL processing part 710 and converts the serial data into parallel data. Then, the ATM physical layer 720 performs ATM physical layer receive-process and sends the data to the receive-cell processing part 750.

The ATM physical layer processing part 720 performs interface function between the ADSL processing part 710 and the transmit-cell processing part 730, 750 in accordance with ATM physical layer standard. When there is no user cell, the ATM physical layer processing part 720 automatically sends and receives idle cell and therefore always maintains connection with ADSL subscribers.

The ADSL processing part 710 receives serial data from the ATM physical layer processing part 720. Then, the ADSL processing part 710 performs ADSL downstream processing with the serial data in accordance with a coding scheme and sends the serial data to ADSL line. Also, the ADSL processing part 710 receives ADSL upstream from ADSL line. Then, the ADSL processing part 710 performs receive-process with the ADSL upstream and sends it to the ATM physical layer processing part 720. That is, the ADSL processing part 710 performs interface function between the ADSL line and the ATM physical layer processing part 720.

The receive-cell processing part 750 is connected with the local bus 780. The receive-cell processing part 750 analyzes 8 bit receive-cell provided from the ATM physical layer processing part 720 and converts the 8 bit receive-cell into 16 bit data. The 16 bit data is temporarily stored at the receive-cell FIFO part (first-in-first-out) 754 and sent to the transmit-receive-cellbus-interface part 770.

Test-cell transmit-FIFO part 752 stores test-cells of self-loopback test temporarily and sends the test-cell to receive-cell control part 753. The test-cells of self-loopback test are generated by the central control part 740 and provided to the test-cell transmit-FIFO part 752 through the local bus. In an embodiment of the present invention, the test-cell transmit-FIFO part is implemented by 1 KB FIFO buffer and it can be extended to 32 KB.

Test-cell receive-FIFO part 751 temporarily stores test-cell provided by the receive-cell control part 753 and sends the test-cell to the central control part 740 through the local bus. In an embodiment of the present invention, the test-cell receive-FIFO part is implemented by 1 KB FIFO buffer and it can be extended to 32 KB.

The receive-cell control part 753 analyzes 8 bit receive-cell provided by the ATM physical layer 720. Then, the receive-cell control part 753 assigns board number and subscriber number to the 8 bit receive-cell and therefore converts the 8 bit receive-cell into 16 bit receive-cell of 28 word length.

The receive-cell control part 753 sends cell-receive-request-signal (CRREQ*) to the ATM layer processing equipment 300. The cell-receive-request-signal (CRREQ*) indicates there are cells to be delivered. When the receive-cell control part 753 receives cell-receive-acknowledge-signal (CRACK*) from the ATM layer processing equipment 300, it stores receive-cell and receive-cell-start-signal (RSOC*) to the receive-cell FIFO part (first-in-first-out) 754 temporarily.

The receive-cell FIFO part 754 temporarily stores 16 bit receive-cell provided by the receive-cell control part 753 and sends the 16 bit receive-cell to the transmit-receive-cellbus-interface part 770. In an embodiment of the present invention, the receive-cell FIFO part 754 is implemented by two 16 bit FIFO buffer of 1 KB and it can be implemented by two 16 bit FIFO buffer of 32 KB.

The receive-cell control part 753 controls the transmit-receive-cellbus-interface part 770 to form loopback path, which sends test-cells provided by the receive-cell FIFO part 754 to the transmit-cell control part 732 in self-loopback test. When self-loopback test is not performed, the transmit-receive-cellbus-interface part 770 receives transmit-cell from the ATM layer processing equipment 300 via the transmit-receive cellbus 400 and makes buffering. Then, transmit-receive-cellbus-interface part 770 sends the transmit-cell to the transmit-cell control part 732 and receives receive-cell from the receive-cell FIFO part 754 and sends the receive-cell to the ATM layer processing equipment 300 after buffering.

The control signal interface part 760 is connected with the local bus 780 and it sends and receives local address signal 11 bit, various control signals (AS*, DS*, R*W), and data signal 8 bit. That is, the control signal interface part 760 is connected with the ATM layer processing equipment 300. The control signal interface part 760 receives 11 bit local address signal (EA1~EA11) and various control signals (EAS*, EDS*, ER*W) from the ATM layer processing equipment 300. The control signal interface part 760 sends and receives 8 bit data signal (ED0~ED7) with the ATM layer processing equipment 300. The control signal interface part 760 communicates with the ATM layer processing equipment 300 through 2 KB dual port RAM.

The control signal interface part 760 receives main clock (23.474 MHz) and cellbus clock (11.7373 MHz) at ECL level and converts them at TTL (transistor transistor logic) level. The control signal interface part 760 provides the main clock (23.474 MHz) and cellbus clock (11.7373 MHz) to the transmit-cell processing part 730 and receive-cell processing part 750 through the local bus 780. Also, the control signal interface part 760 provides function-alarm-signal and eject-alarm-signal to the ATM layer processing equipment 300 with logic high.

The ADSL subscriber processing equipments 700 in accordance with the present invention supports four ADSL subscribers per board and supports downstream 1 Mbps~8 Mbps and upstream 64 Kbps~640 Kbps. Therefore, it is capable of providing high-speed multimedia service to remote ADSL subscribers.

In addition, since the ADSL subscriber processing equipments in accordance with the present invention can be installed in switching devices, ADSL subscribers can be controlled within switching devices and the status of ADSL subscribers can be known.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An ADSL (asymmetric digital subscriber line) subscriber processing equipment in an ATM (Asynchronous Transfer Mode) switch, the ADSL subscriber processing equipment being connected with an ATM layer processing device by a transmit-receive cellbus and control signal bus and being connected to a plurality of ADSL subscribers by an ADSL line, comprising:

transmit-cell processing means for detecting ADSL subscribers on the basis of ATM parallel transmit-cell, the ATM parallel transmit-cell being supplied by the ATM layer processing device;

ATM physical layer processing means for converting the parallel transmit-cell into serial transmit-cell, performing ATM physical layer transmit-process on the serial transmit-cell, converting serial receive-cell into parallel receive-cell, the serial receive-cell being supplied by the ADSL processing means, and performing ATM Physical layer receive-process on the parallel receive-cell;

ADSL processing means for receiving the serial transmit-cell from the ATM physical layer processing means, performing ADSL downstream process on the serial transmit-cell, sending the processed serial transmit-cell to ADSL subscriber through ADSL line, receiving ADSL upstream from the ADSL subscriber, performing signal processing on the ADSL upstream, and sending the signal processed ADSL upstream to the ATM physical layer processing means;

receive-cell processing means for receiving the parallel receive-cell from the ATM physical layer processing means, adding subscriber information to the parallel receive-cell, and sending the information added to the parallel receive-cell to the ATM layer processing device; and central control means for assigning addresses to the transmit-cell processing means, the ATM physical layer processing means, the ADSL processing means, and the receive-cell processing means, controlling ADSL subscriber processing equipment by providing a system clock, and generating a test-cell for self loopback test.

2. The ADSL subscriber processing equipment of claim 1 further comprises transmit-receive cellbus interface means for making interface between the transmit-receive cellbus and the transmit-cell processing means/receive-cell processing means.

3. The ADSL subscriber processing equipment of claim 2 wherein the transmit-cell processing means detects ADSL subscriber to whom the transmit-cell is to be delivered on the basis of VPI (virtual pass identifier) and VCI (virtual channel identifier) in case that the transmit-cell is point-to-point transmit-cell and detects ADSL subscriber to whom the transmit-cell is to be delivered by converting VPI and VCI into real VPI and real VCI in case that the transmit-cell is point-to-multi point transmit-cell, the VPI and VCI included in the transmit-cell.

4. The ADSL subscriber processing equipment of claim 3 wherein the transmit-cell processing means comprises:

VPI/VCI table part for storing real VPI and real VCI, the real VPI and the real VCI corresponding to VPI and VCI of point-to-multi point transmit-cell respectively; and transmit-cell control part for bit-converting transmit-cell received from the transmit-receive cellbus interface means, detecting ADSL subscribers to whom the transmit-cell is to be delivered on the basis of VPI and VCI of the transmit-cell, and sending the bit-converted transmit-cell to the ATM physical layer processing means.

5. The ADSL subscriber processing equipment of claim 4 wherein the transmit-cell processing means further comprises transmit-cell FIFO (first-in first-out) part, the transmit-cell FIFO part storing bit-converted transmit-cell temporarily, the bit-converted transmit-cell being sent from transmit-cell control part to ATM physical layer processing means.

6. The ADSL subscriber processing equipment of claim 4 wherein the transmit-cell control part converts the 16 bit parallel transmit-cell into 8 bit parallel transmit-cell.

7. The ADSL subscriber processing equipment of claim 2 wherein the receive-cell processing means comprises:

receive-cell control part for analyzing receive-cell provided by the ATM physical layer processing means, adding ADSL subscriber information to the receive-cell, performing bit-conversion on the receive-cell, and sending the bit-converted receive-cell to transmit-receive cellbus interface means; and receive-cell FIFO (First-in First-out) for storing receive-cell temporarily, the receive-cell being sent from the receive-cell control part to the transmit-receive cellbus interface means.

8. The ADSL subscriber processing equipment of claim 7 wherein the receive-cell processing means comprises:

test-cell transmit-FIFO part for storing test-cell and providing the test-cell to the receive-cell control part, the test-cell being generated by the central control means for use of loopback test; and test-cell receive-FIFO part for receiving test-cell from the receive-cell control part and sending the test-cell to the central control means.

9. The ADSL subscriber processing equipment of claim 8 wherein the transmit-receive cellbus interface means receives test-cell from the receive-cell control part, sends the test-cell to the transmit-cell control means, receives receive-cell from the receive-cell control part, sends the receive-cell to the transmit-receive cellbus, receives transmit-cell from the transmit-receive cellbus, and sends the transmit-cell to the transmit-cell control means.

10. The ADSL subscriber processing equipment of claim 7 wherein the receive-cell control means converts the 8 bit parallel receive-cell into 16 bit parallel receive-cell.

11. The ADSL subscriber processing equipment of claim 1 further comprises control signal bus interface means, the control signal bus interface means communicating various control signals, data signal, and clock signal with the ATM layer processing device through dual port RAM and sending the various control signals, data signal, and clock signal to the transmit-cell processing means, the ATM physical layer processing means, the ADSL processing means, the receive-cell processing means, and the central control means.

12. The ADSL subscriber processing equipment of claim 11 wherein the control signal bus interface means receives main clock of ECL (emitter coupled logic) level, cellbus clock of ECL level, converts the main clock of ECL level and the cellbus clock of ECL level into main clock of TTL (transistor transistor logic) level and cellbus clock of TTL level, and sends the main clock of TTL level and the cellbus clock of TTL level to the transmit-cell processing means, the ATM physical layer processing means, the ADSL processing means, the receive-cell processing means, and the central control means.

13. The ADSL subscriber processing equipment of claim 11 wherein the central control means generates function-alarm-signal and eject-alarm-signal when an error is occurred in ADSL subscriber processing device and the control signal bus interface means sends the function-alarm-signal and the eject-alarm-signal to the ATM layer processing device.

14. The ADSL subscriber processing equipment of claim 1 transmits downstream data at speed of 1 Mbps~8 Mbps and transmits upstream data at speed of 64 kbps~640 Kbps, the downstream data being sent from the ATM layer processing device to ADSL subscribers, the upstream data being sent from ADSL subscribers to the ATM layer processing device.

* * * * *